United States Patent [19]

Pannwitz

[11] 4,175,804
[45] Nov. 27, 1979

[54] FLEXIBLE SPRING BEARING

[76] Inventor: Hans U. Pannwitz, P.O. Box 67, Odessa, Fla. 33556

[21] Appl. No.: 834,903

[22] Filed: Sep. 20, 1977

[51] Int. Cl.$^2$ ............................................. F16C 27/06
[52] U.S. Cl. ..................................... 308/26; 267/153
[58] Field of Search ................. 188/1 B, 1 C; 248/22; 267/63 R, 140, 141, 153; 308/26, 184 R

[56] References Cited

U.S. PATENT DOCUMENTS

| | | | |
|---|---|---|---|
| 2,059,244 | 11/1936 | Kiekhaefer | 188/1 A X |
| 2,614,896 | 10/1952 | Pierce | 308/26 |
| 3,263,985 | 8/1966 | Planta | 267/153 X |
| 3,393,021 | 7/1968 | Guth | 308/26 |
| 3,412,990 | 11/1968 | Gladstone | 267/153 X |
| 3,556,503 | 1/1971 | van Moss | 267/153 |
| 3,687,440 | 8/1972 | Jarret et al. | 267/141 |
| 3,976,338 | 8/1976 | Trachte et al. | 308/26 |
| 4,040,690 | 8/1977 | Finney | 308/26 X |

*Primary Examiner*—Duane A. Reger
*Attorney, Agent, or Firm*—Stein & Frijouf

[57] ABSTRACT

A flexible spring bearing having concave and convex portions, and including main bearing race and thrust race are incorporated to be contiguous to the end of the concave portion. The main bearing race along with the cylindrical configuration rotates, via a bearing means, upon the thrust race. The bearing means may be an annular protrusion disposed concentric with the cylindrical configuration. The bearing means is protected from corrosion and dirt by a set of annular skirts and walls which form a channel with the bearing means located therein. The channel may be prepacked with a lubricant, thereby creating a hydraulic floating relationship between the main bearing race and thrust race. A visual indicator provides a means to measure the amount of surface wear of the bearing means on the thrust race.

19 Claims, 9 Drawing Figures

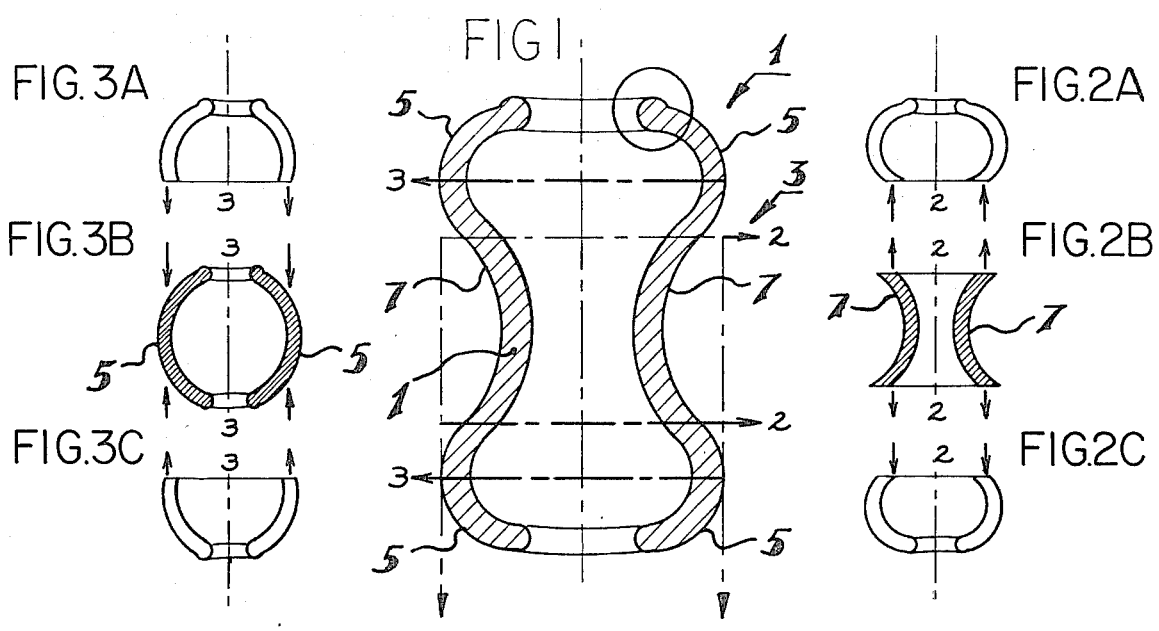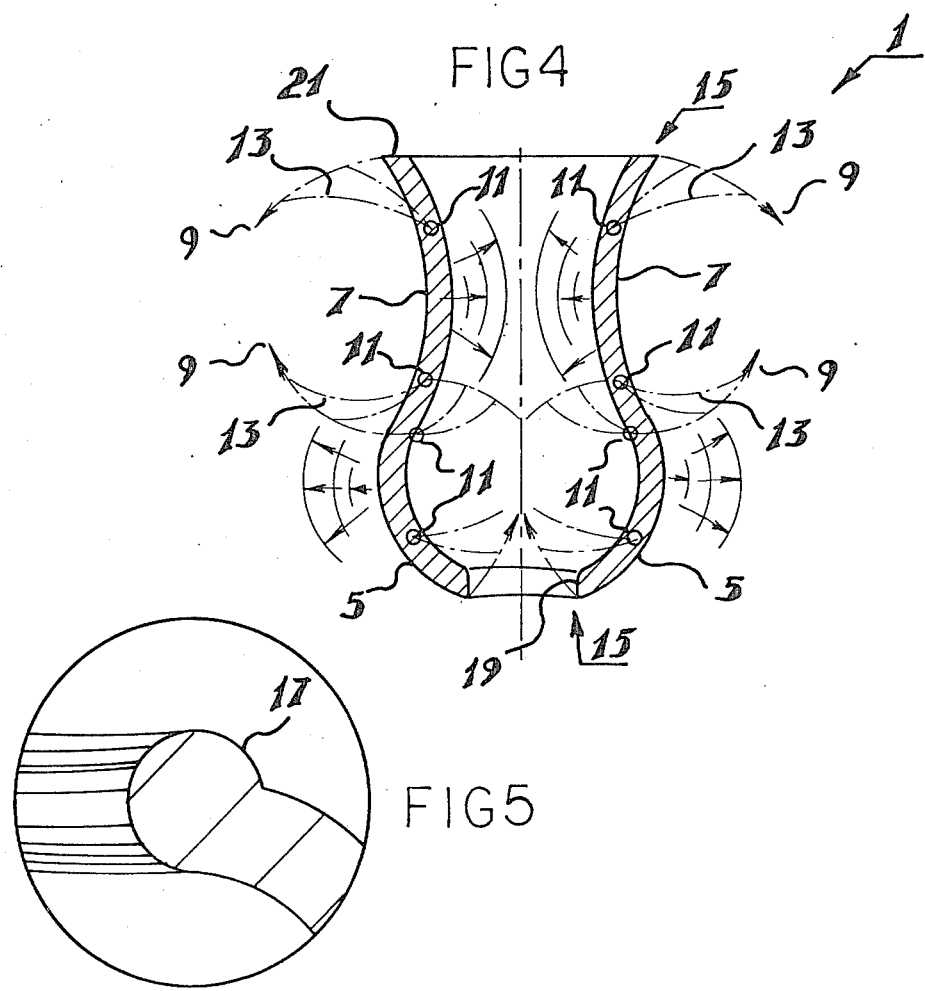

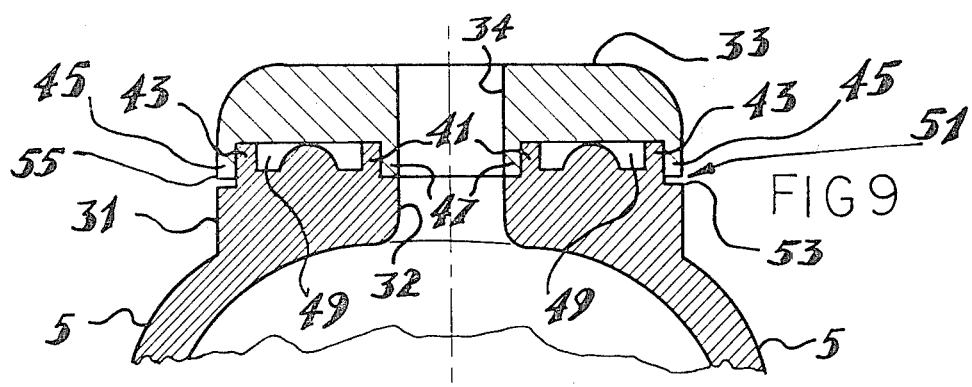
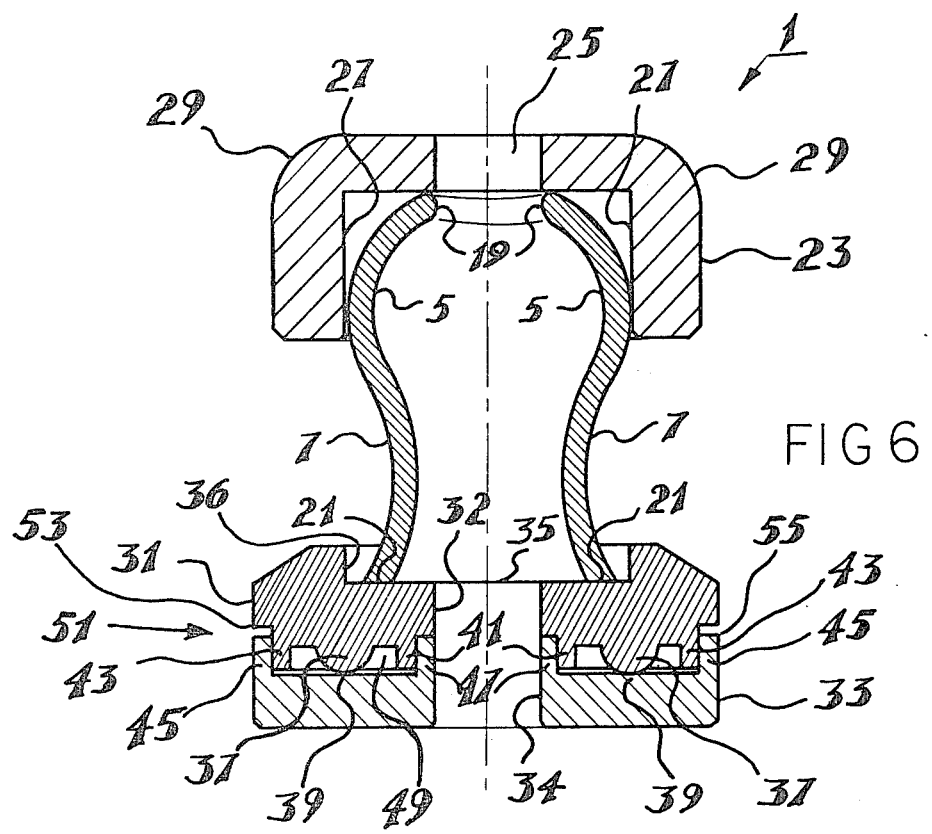
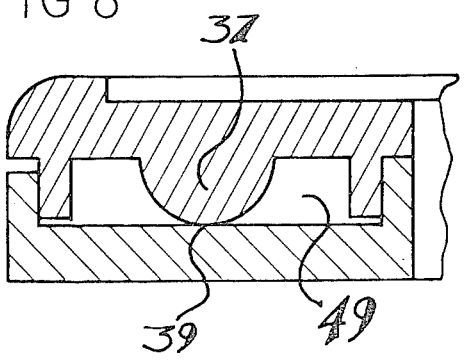

FLEXIBLE SPRING BEARING

BACKGROUND OF THE INVENTION

1. Field of the Invention

This invention relates to flexible spring bearings such as thrust bearings, pressure-springs, shock absorbers, or flexible self-aligners. Its many embodiments allows this invention to be used in many mechanical devices such as turret mechanisms, carousels, davits, cranes and swivel-joints. The invention is particularly applicable in high corrosive environments where hermetically sealed, high load, and low revolution thrust bearings are utilized.

2. Description of the Prior Art

Presently there exists many types of bearings. Typical bearings consist of steel rollers or ball bearings encased in a raceway. More particularly, there exists other types of bearings which are flexible to act as shock absorbing bearings.

U.S. Pat. Nos. 3,697,144 and 3,961,829 are typical flexible bearings which are primarily used as resilient supports or mountings. They comprise rubber sleeves which render the bearings flexible. Unfortunately, the rubber has a tendency to decay, especially when used in a dirty, or otherwise hostile environment.

U.S. Pat. Nos. 3,033,622 and 3,941,433 are other types of flexible bearings. They are primarily designed to be used as a shock absorber rather than a bearing per se. Hence, they are undesirable in applications where rotational and shock absorbing bearings are needed.

Therefore, in order to overcome the particular inherent inadequacies of the prior art, it is an object of this invention is to provide a bearing to be utilized as a substantially frictionless bearing.

A further object of this invention is to provide a bearing to be utilized as a shock absorbing bearing.

A still further object of this invention is to provide a bearing that is hermetically sealed so that it can be utilized in a dirty environment.

A still further object of this invention is to provide a bearing made from a non-corrosive, non-decayable material.

Other objects and a fuller understanding of this invention may be had by referring to the summary of the invention, the description and the claims, taken in conjunction with the accompanying drawings.

SUMMARY OF THE INVENTION

This invention is a new flexible spring bearing. The many variations of the configuration allows it to be easily adapted into many thrust bearing and shock absorbing applications. Typical applications include, for example, turret mechanisms, carousels, davits, cranes and swivel-joints.

The flexible spring bearing comprises a generally cylindrical body with its walls curved in a specific manner, depending on its particular use, to render the body flexible. The walls may be convexly curved outward or concavely curved inward. A combination of such curvatures could also be utilized. For example, a convex curvature could be disposed circumferentially about both ends of the cylindrical body and a concave curvature could be disposed about its center. Hence, this particular combination of curvatures would render the body into an hour-glass configuration. It would be most flexible at a given minimum height with a maximum longitudinal response. As noted above, other combinations are possible by simply incorporating other combinations of the convex or concave curvatures. The flexibility of the spring bearing is thus determined by the combination of curvatures and the material of which it is made from.

The flexible spring bearing further comprises a main bearing race and thrust race. The main bearing race may either be integrally formed with the cylindrical body or disposed contiguous to it. The cylindrical body and main bearing race would then rotate via a bearing means upon the thrust race.

The bearing means is an annular cross-sectional semi-circular protrusion which is integrally formed with either the main bearing race or thrust race. Thus, contrary to conventional ball or roller bearings, the protrusion cannot lock-up with its mating part since it is integrally incorporated into the spring bearing.

The main bearing race is protected from dirt and corrosion by annular skirts and walls. The skirts and walls form a hermetically sealed channel with the bearing means located therein.

The channel may be prepacked with a lubricant. The lubricant would reduce the coefficient of friction of the bearing means thereby lessening the friction created by the bearing means and its mating components. Furthermore, the channel may be hydraulically pressurized. The pressurization would then create a hydraulic floating relationship between the main bearing race and thrust race. Hence, the bearing means actually "floats" on the thrust race, thereby minimizing friction and creating an inherent self-locking property.

A spring retaining cap may be incorporated into the spring bearing. It would be configured to be seated over the convex curvature disposed at the end of the cylindrical body. The spring retaining cap would evenly distribute axial pressure throughout the cylindrical body. Also, the walls of the spring retaining cap would regulate the flexibility of the convex curvature.

This invention accordingly comprises an apparatus possessing the features, properties and the relation of elements which will be exemplified in the article hereinafter described and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a cross-sectional view of the first embodiment of the flexible spring bearing.

FIG. 2 is a cross-sectional view of the second embodiment of the flexible spring bearing.

FIG. 3 is a cross-sectional view of the third embodiment of the flexible spring bearing.

FIG. 4 is a cross-sectional view of the fourth embodiment of the flexible spring bearing.

FIG. 5 is a cross-sectional view of the semi-circular configuration of the annular tip portion.

FIG. 6 is a cross-sectional view of the flexible spring bearing, main bearing race, thrust race and spring retaining cap.

FIG. 7 is a partial cross-sectional view of the annular protrusion integral to the main bearing race.

FIG. 8 is a partial cross-sectional view of the annular protrusion integral with the thrust race.

FIG. 9 is a cross-sectional view of the main bearing race integral with the cylindrical configuration.

Similar reference characters refer to similar parts throughout the several views of the drawings.

DESCRIPTION OF THE PREFERRED EMBODIMENT

FIG. 1 is a cross-sectional view of the first embodiment of the flexible spring bearing 1. It consists of a substantially cylindrical configuration 3 with an annular convex bulge 5 disposed circumferentially about each end of the cylindrical configuration 3. An annular concave bulge 7 is similarly disposed circumferentially about the center of the cylindrical configuration 3. This first embodiment is the most flexible at a given minimum height with a maximum longitudinal response. Accordingly, its fundamental function is a pressure-spring, shock absorber, or a flexible self-aligner.

Other embodiments of the spring bearing 1 are developed by virtually slicing the first embodiment in a specific manner. FIG. 2 is a second embodiment of the spring bearing 1 obtained by slicing the first embodiment along lines 2—2. Hence, the result is a substantially cylindrical configuration 3 with an annular concave bulge 7 disposed circumferentially about its center. Similarly, FIG. 3 is a third embodiment of the spring bearing 1 obtained by slicing off the end portions along lines 3—3 and then connecting them together. Such creates a substantially cylindrical configuration 3 with an annular convex bulge 5 disposed circumferentially about the center portion.

FIG. 4 is a cross-sectional view of the fourth embodiment of the spring bearing 1. It consists of a substantially cylindrical configuration 3 with an annular concave bulge 7 and an annular convex bulge 5 disposed circumferentially at opposite ends of the spring bearing 1. It is more particularly shown as an example to demonstrate the typical flexing characteristics of all of the embodiments. The direction of flex is indicated by the flex directional arrows 9 which originates from the focal points 11. The flex responses are made more visible through the superimposure of flex lines 13 along the paths of the flex directional arrows 9.

The frictionless characteristics of the spring bearing 1 are enhanced by the different configurations of the surface contact points. As best shown in FIG. 1, and enlarged in FIG. 5, an annular lip portion 15 includes a cross-sectional semi-circular configuration 17. During use, a mandrel or the like is inserted into the center of the cylindrical configuration 3 and is seated upon the lip portion 15. Therefore, upon movement, the mandrel rotates upon a cross-sectional apex point of the semi-circular configuration 17. This surface contact point provides a minimum contact area and thus a minimum friction surface.

Another configuration of the surface contact point is best shown in FIG. 4. It consists of an annular lip portion comprising an arcuate configuration 19. During use, a rod, shaft, or the like is inserted into the center of the cylindrical configuration 3 and rotates against the arcuate configuration 19. A minimal amount of friction is assured by the surface contact surface being only a single cross-sectional apex point.

The third configuration of the surface contact point is best shown in FIG. 4 which includes a flat configuration 21 being normal to the axial line of the cylindrical configuration 3. Although the flat configuration 21 may slip under excessive rotational force, it is primarily intended to be used in a static position.

The spring bearing 1 may include a spring retaining cap 23 shown in FIG. 6 to be receivable over the convex bulge 5 of the cylindrical configuration 3. A hole 25 is located within the center of the retainer cap 23 thereby allowing a shaft or the like to be inserted therein. Walls 27 of the retaining cap 23 are disposed contiguous to the convex bulge 5 the outward flexibility of the convex bulge 5. It also facilitates the centralization of the spring retaining cap 23 around the cylindrical configuration 3 contained therein. Edge portion 29 of the spring retaining cap 23 may be rounded as shown.

The flexible spring bearing 1 may also include a main bearing race 31 and a thrust race 33 configured and dimensioned to be disposed contiguous via a bearing means to the main bearing race 31. The bearing means provides an almost frictionless surface for the main bearing race 31 to rotate upon the thrust race 33. A hole 32 is provided within the main bearing race 31 to be concentric with the cylindrical configuration 3 and concentric with another hole 34 within the thrust race 33. The two holes 32 and 34, are dimensioned to receive a shaft or the like when contained within the cylindrical configuration 3.

FIG. 6 shows the first embodiment of the main bearing race 31. The annular flat configuration 21 of the end portion of the cylindrical configuration 3 is seated concentrically and contiguously within a circular recess 35. As pressure is applied in an axial direction to the cylindrical configuration 3, the annular flat configuration 21 has a tendency to diametrically flex apart. Walls 36 of the circular recess 35 regulates the flexing and prevents the annular flat configuration 21 from reaching a fatigue diameter.

The bearing means comprises an annular semi-circular protrusion 37 which is integral with the main bearing race 31 and disposed contiguous to the thrust race 33. During use, a cross-sectional apex point 39 of the semi-circular protrusion 37 is the primary point of friction contact with the thrust race 33 providing a minimal amount of contact surface and thus a minimum amount of friction.

The main bearing race 31 further includes an inner annular skirt 41 and outer annular skirt 43 disposed about the semi-circular protrusion 37.

Both skirts 41 and 43 have a substantially rectangular cross-section and are integral with the main bearing race 31.

The thrust race 33 includes a raceway formed by an outer annular wall 45 and an inner annular wall 47 which are contiguously disposed in an adjacent relationship with the outer annular skirt 43 and the inner annular skirt 41, respectively to create a hermetically sealed channel 49 therebetween.

The channel 49 may be prepacked with a semi-solid lubricant to reduce the friction between the semi-circular protrusion 37 and the thrust race 33. As axial pressure is applied to the cylindrical configuration 3, the semi-solid lubricant becomes pressurized and force the skirts 41 and 43 against the walls 47 and 45, respectively. Furthermore, the pressurized lubricant creates a hydraulic floating relationship between the main bearing race 31 and the thrust race 33 thereby assuring that the channel 49 will remain hermetically sealed under pressure or temperature differentials.

Other embodiments of the semi-circular protrusion 37 may be incorporated into the main bearing race 31 to provide a bearing means for the main bearing race 31 to rotate upon the thrust race 33. For instance, as best shown in FIG. 7, a plurality of semi-circular protrusions 37 could be integrally formed on the main bearing race 31. Each would be disposed concentric with respect to each other and the cylindrical configuration 3. A cross-sectional apex point 39 of each semi-circular protrusion 37 would then be contiguous to the thrust race 33. Alternatively, at least one semi-circular protrusion 37 could be integrally formed on the thrust race (see FIG. 8). Hence, the main bearing race 31 would then rotate upon the thrust race 33 via a cross-sectional apex point 39 of the semicircular protrusion 37 integral with the thrust race 33.

The main bearing race 31 may be an integral portion of the cylindrical configuration 3. As shown in FIG. 9, such could be substituted for the spring retaining cap 23 of FIG. 6 and thus disposed at the end portion of the convex bulge of the cylindrical configuration 3.

It is noted that although specific combinations of the cylindrical configuration 3, spring retaining cap 23, main bearing race 34 and thrust race 33 are disclosed, other are possible, depending on the particular use of the spring bearing 1. The different combinations of the curvatures of the cylindrical configuration 3 may be used in combination with the spring retaining cap 23 and main bearing race 31. Of course, as noted above, the spring retaining cap 23 or main bearing race 31 may be integrally formed with any portion of the convex bulges 5 or concave bulges 7 of the cylindrical configuration 3.

The flexible spring bearing 1 further comprises a visual indicator 51. The visual indicator 51 is created by the lower corner 53 of the main bearing race 31 being measurably disposed apart from the upper corner 55 of the outer annular wall 45. As the semi-circular protrusion 37 wears down during use, the distance between the upper corner 55 and lower corner 53 correspondingly decreases. Hence, the degree of surface wear of the apex point 39 of the semi-circular protrusion 37 can easily be determined by simply measuring, with for example, feeler gauges, the decrease in the said distance.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

Now that the invention has been claimed:

1. A flexible spring bearing having a substantially cylindrical configuration and comprising at least one arcuate portion extending circumferentially about at least one section of said cylindrical configuration;
   a main bearing race with an aperture therein concentric with the said cylindrical configuration and disposed contiguous with an end portion of said cylindrical configuration;
   a thrust race disposed contiguous to said main bearing race;
   bearing means disposed between said main bearing race and said thrust race whereby said main bearing race may rotate upon said thrust race;
   said bearing means including at least one protrusion integrally extending from one of said races and annularly disposed concentric with said cylindrical configuration; and
   said main bearing race further comprising an inner annular skirt and an outer annular skirt thereby forming a channel about said bearing means located therein for receiving a lubricant.

2. The flexible spring bearing of claim 1 wherein said arcuate portion comprises at least one substantially convex bulge disposed circumferentially about the said cylindrical configuration.

3. The flexible spring bearing of claim 1 wherein said arcuate portion comprises at least one substantially concave bulge disposed circumferentially about the said cylindrical configuration.

4. The flexible spring bearing of claim 1 wherein said arcuate portion comprises at least one substantially convex bulge and at least one substantially concave bulge disposed circumferentially about the said cylindrical configuration.

5. The flexible spring bearing of claim 2 wherein a said convex bulge is located at each end portion of the said cylindrical configuration.

6. The flexible spring bearing of claim 4 wherein said convex bulge and a concave bulge are located at opposite ends of said cylindrical configuration.

7. The flexible spring bearing of claim 5 wherein said arcuate portion further comprises a substantially concave bulge located between two said convex bulges.

8. The flexible spring bearing of claim 1 further comprising a lip portion disposed annularly about at least one end portion of the said cylindrical configuration whereby a post, mandrel, axle, shaft, rod, or the like may be inserted therein to rotate upon said lip portion.

9. The flexible spring bearing of claim 8 wherein said lip portion comprises a substantially cross-sectional semi-circular configuration.

10. The flexible spring bearing of claim 8 wherein said lip portion comprises a substantially cross-sectional arcuate configuration.

11. The flexible spring bearing of claim 8 wherein said lip portion comprises a substantially flat configuration which is normal to the axial line of said cylindrical configuration.

12. The flexible spring bearing of claim 2 wherein said convex bulge is disposed circumferentially about an end portion of said cylindrical configuration and wherein said flexible spring bearing further comprises a spring retaining cap with an aperture in the center thereof whereby said spring retaining cap is concentrically disposed over said convex bulge.

13. The flexible spring bearing of claim 12 wherein the inner wall of the said spring retaining cap is contiguous with the said convex bulge thereby regulating the flexibility of the said bulge.

14. The flexible spring bearing of claim 1 wherein said thrust race further comprises a raceway formed by an inner annular wall and an outer annular wall which are contiguous to said annular skirt and said outer annular skirt, respectively.

15. The flexible spring bearing of claim 14 wherein said main bearing race and said thrust race further comprise a visual indicator means to indicate the degree of surface wear of said bearing means upon said thrust race.

16. The flexible spring bearing of claim 15 wherein said visual indicator means comprises a lower corner of said main bearing race means measurably disposed apart from an upper corner of said outer annular wall whereby the distance between said lower corner and said upper corner decreases as said bearing means wears down.

17. The flexible spring bearing of claim 11 wherein said main bearing race comprises a circular cavity therein concentric with the said cylindrical configuration whereby said flat configuration fits into the said circular cavity.

18. The flexible spring bearing of claim 1 wherein said main bearing race is an integral portion of said end portion of said cylindrical configuration.

19. The flexible spring bearing of claim 1 wherein said lubricant is pressurized whereby said main bearing race floats upon said lubricant thereby creating a hydraulic floating relationship between said main bearing race and said thrust race.

* * * * *